US 10,358,047 B2

(12) United States Patent
Murata et al.

(10) Patent No.: US 10,358,047 B2
(45) Date of Patent: Jul. 23, 2019

(54) ELECTRIC POWER STORAGE SYSTEM

(71) Applicant: Toyota Jidosha Kabushiki Kaisha, Toyota-shi Aichi-ken (JP)

(72) Inventors: Takashi Murata, Kasugai (JP); Tomokazu Masuda, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 383 days.

(21) Appl. No.: 15/313,150

(22) PCT Filed: May 26, 2015

(86) PCT No.: PCT/IB2015/000756
§ 371 (c)(1),
(2) Date: Nov. 22, 2016

(87) PCT Pub. No.: WO2015/181614
PCT Pub. Date: Dec. 3, 2015

(65) Prior Publication Data
US 2017/0120775 A1 May 4, 2017

(30) Foreign Application Priority Data
May 28, 2014 (JP) ................................ 2014-110369

(51) Int. Cl.
*H02J 7/00* (2006.01)
*B60L 11/18* (2006.01)
(Continued)

(52) U.S. Cl.
CPC ............ *B60L 11/1875* (2013.01); *B60K 6/48* (2013.01); *B60L 1/02* (2013.01); *B60L 7/16* (2013.01);
(Continued)

(58) Field of Classification Search
CPC .............. B60L 11/1875; B60L 11/1811; B60L 11/1816; H01M 10/615; H01M 10/625;
(Continued)

(56) References Cited

U.S. PATENT DOCUMENTS 6,624,615 B1 * 9/2003 Park ...................... B60L 3/0046
320/150
9,834,200 B2 * 12/2017 Murata ................... B60K 6/445
(Continued)

FOREIGN PATENT DOCUMENTS

JP          2000-040536 A      2/2000
JP          2004-088985 A      3/2004
(Continued)

*Primary Examiner* — Zixuan Zhou
(74) *Attorney, Agent, or Firm* — Dinsmore & Shohl LLP

(57) ABSTRACT

An electric power storage system for a vehicle includes a temperature sensor configured to detect a temperature of a battery, a battery heater, a charger connectable with an external power supply and configured to deliver external power to the battery and the battery heater, and a controller. In the system, a first electric power is supplied to the battery heater when the state of charge of the battery is larger than a predetermined value and the temperature of the battery is equal to or lower than the predetermined temperature, and a second electric power is supplied to the battery heater when the state of charge of the battery is equal to or smaller than the predetermined value and the temperature of the battery is equal to or lower than the predetermined temperature. The first electric power is smaller than the second electric power.

7 Claims, 6 Drawing Sheets

(51) Int. Cl.
*B60K 6/48* (2007.10)
*B60L 7/16* (2006.01)
*H02J 7/08* (2006.01)
*H01M 10/42* (2006.01)
*H01M 10/44* (2006.01)
*H01M 10/48* (2006.01)
*H01M 10/625* (2014.01)
*H01M 10/615* (2014.01)
*H01M 10/6571* (2014.01)
*H02J 7/04* (2006.01)
*B60L 1/02* (2006.01)
*B60L 9/00* (2006.01)

(52) U.S. Cl.
CPC ....... *B60L 11/1811* (2013.01); *B60L 11/1816* (2013.01); *B60L 11/1862* (2013.01); *H01M 10/425* (2013.01); *H01M 10/443* (2013.01); *H01M 10/486* (2013.01); *H01M 10/615* (2015.04); *H01M 10/625* (2015.04); *H01M 10/6571* (2015.04); *H02J 7/0091* (2013.01); *H02J 7/04* (2013.01); *H02J 7/087* (2013.01); *B60L 2240/545* (2013.01); *H01M 2220/20* (2013.01); *Y02T 10/7005* (2013.01); *Y02T 10/705* (2013.01); *Y02T 10/7044* (2013.01); *Y02T 10/7072* (2013.01); *Y02T 90/14* (2013.01)

(58) Field of Classification Search
CPC .... H01M 10/6571; B60K 6/48; H02J 7/0091; H02J 7/04; H02J 7/087
USPC ................................... 320/109, 150; 701/22
See application file for complete search history.

(56) References Cited

U.S. PATENT DOCUMENTS

| | | | |
|---|---|---|---|
| 2009/0167253 A1 | 7/2009 | Muraoka et al. | |
| 2012/0025785 A1* | 2/2012 | Gaben ............... | H01M 10/4207 320/150 |
| 2013/0082519 A1 | 4/2013 | Nagakura et al. | |
| 2013/0147424 A1* | 6/2013 | Takano ............... | H01M 10/443 320/107 |

FOREIGN PATENT DOCUMENTS

| | | |
|---|---|---|
| JP | 2007-330008 A | 12/2007 |
| JP | 2012-019678 A | 1/2012 |
| JP | 2012-191782 A | 10/2012 |

* cited by examiner

ELECTRIC POWER STORAGE SYSTEM

CROSS-REFERENCE TO RELATED APPLICATIONS

This application is a National Stage of International Application No. PCT/M2015/000756 filed on May 26, 2015, which claims priority to Japanese Patent Application No. 2014-110369, filed May 28, 2014, the entire contents of which are hereby incorporated by reference.

BACKGROUND

1. Field

The disclosure relates to an electric power storage system for a vehicle, which includes a battery that supplies electric power to a motor for moving the vehicle and is chargeable with electric power supplied from an external power supply.

2. Description of Related Art

In a plug-in hybrid vehicle or an electric vehicle, a battery that supplies electric power to a motor for moving the vehicle can be charged (externally charged) with electric power supplied from an external power supply. In a control system as described in Japanese Patent Application Publication No. 2012-191782 (JP 2012-191782 A), a part of external power is delivered to a heater, such that the battery can be warmed up and charged. This is because, when the temperature of the battery (battery temperature) is reduced, the internal resistance increases, and the charging efficiency deteriorates, resulting in reduction of the input and output of the battery after external charging.

SUMMARY

In the system of JP 2012-191782 A, for example, the battery is charged such that the state of charge (SOC) is kept at a given value, and electric power is supplied to the heater so as to heat the battery. If supply of the power to the heater is interrupted or stopped while the external power is being supplied to both the battery and the heater, the power supposed to be supplied to the heater is diverted and added to charging power. As a result, the charging power supplied to the battery is temporarily increased rapidly. If the SOC of the battery is at a high level at this time, the voltage of the battery may exceed the upper-limit voltage, due to the rapid increase of the charging power. If the voltage of the battery exceeds the upper-limit voltage, the battery may deteriorate.

Embodiments provide an electric power storage system that is able to reduce deterioration of a battery when external charging and heating are conducted.

A first aspect is concerned with an electric power storage system for a vehicle. The vehicle includes a motor for moving the vehicle, and a battery configured to supply electric power to the motor. The battery is adapted to be charged with external power supplied from an external power supply. The electric power storage system includes a temperature sensor, a battery heater, a charger, and a controller. The temperature sensor is configured to detect a temperature of the battery. The battery heater is configured to raise the temperature of the battery. The charger is connectable with the external power supply, and is configured to deliver the external power to the battery and the battery heater, respectively. The controller is configured to perform charge control and temperature regulation control when the temperature of the battery is equal to or lower than a predetermined temperature. The charge control is control for charging the battery with the external power. The temperature regulation control is control for supplying a part of the external power to the battery heater and raising the temperature of the battery when the temperature of the battery is equal to or lower than the predetermined temperature. In the electric power storage system, a first electric power is supplied to the battery heater when a state of charge of the battery is larger than a predetermined value and the temperature of the battery is equal to or lower than the predetermined temperature, and a second electric power is supplied to the battery heater when the state of charge of the battery is equal to or smaller than the predetermined value and the temperature of the battery is equal to or lower than the predetermined temperature. The first electric power is smaller than the second electric power.

According to the first aspect, even when the temperature of the battery is low, and external charging and heating of the battery need to be conducted, electric power supplied to the battery heater in a region where the state of charge of the battery is larger than the predetermined value is controlled to be smaller than electric power supplied to the battery heater in a region where the state of charge of the battery is equal to or smaller than the predetermined value. With this arrangement, the amount of power diverted and added to charging power at the time when the power supply to the battery heater is stopped can be reduced. Therefore, the voltage of the battery is less likely or unlikely to exceed the upper-limit voltage due to otherwise possible increase of the charging power. In this manner, deterioration of the battery can be reduced or curbed.

In the electric power storage system as described above, the charge control may include first charge control and second charge control. The first charge control is performed by the controller when the state of charge of the battery is equal to or smaller than the predetermined value. The second charge control is performed by the controller when the state of charge of the battery is larger than the predetermined value. The controller may be configured to perform the temperature regulation control while performing the first charge control such that the power supplied to the battery heater is reduced as the state of charge of the battery increases.

As the battery is charged, the state of charge of the battery increases, and the voltage of the battery increases toward the upper-limit voltage. Accordingly, the power supplied to the battery heater is reduced as the state of charge of the battery is higher, such that the power diverted and added to charging power can be reduced even if the power supply to the battery heater is stopped while charging and heating of the battery are carried out. Therefore, the voltage of the battery is less likely or unlikely to exceed the upper-limit voltage under the first charge control, while the chance of raising the temperature of the battery is assured. Thus, deterioration of the battery can be reduced or curbed.

In the electric power storage system as described above, the controller may be configured to perform the first charge control such that charging power supplied to the battery is reduced as the state of charge of the battery increases.

The charging power supplied to the battery is reduced as the state of charge of the battery is higher, such that the charging power supplied to the battery can be suitably controlled, even if the power supply to the battery heater is stopped while charging and heating of the battery are carried out, and the power is diverted and added to the charging power. Therefore, the voltage of the battery is less likely or unlikely to exceed the upper-limit voltage under the first charge control, while the chance of raising the temperature of the battery is assured. Thus, deterioration of the battery can be reduced.

In the electric power storage system as described above, the charge control may include first charge control and second charge control. The first charge control is performed by the controller when the state of charge of the battery is equal to or smaller than the predetermined value, and including a plurality of control zones. The control zones are defined based on a magnitude of the state of charge of the battery. The second charge control is performed by the controller when the state of charge of the battery is larger than the predetermined value. The controller may be configured to perform the charge control while performing the temperature regulation control, such that charging power supplied to the battery is reduced, and the power supplied to the battery heater is reduced, as the state of charge of the battery in one of the control zones in which the first charge control is currently performed is higher.

As the battery is charged, the state of charge of the battery increases, and the voltage of the battery increases toward the upper-limit voltage. Therefore, the first charge control may be divided into a plurality of control zones depending on the magnitude of the state of charge of the battery, and the power supplied to the battery heater may be reduced, and the charging power supplied to the battery may be reduced, as the SOC of the battery in the current control zone is higher. With this arrangement, even if supply of the power to the battery heater is stopped while the battery is being charged and heated, the amount of power diverted and added to the charging power can be reduced. Also, even if the power supplied to the battery heater is diverted and added to the charging power, the charging power supplied to the battery can be controlled to a relatively low level. Accordingly, in the first charge control, the voltage of the battery is less likely or unlikely to exceed the upper-limit voltage while the chance of raising the temperature of the battery is assured. Consequently, degradation of the battery can be reduced.

In the electric power storage system as described above, the second charge control may be a charge mode in which the battery is charged in a region in which the state of charge of the battery ranges from the predetermined value to a predetermined upper-limit value. The battery may be charged in the charge mode with charging power that is smaller than charging power of the first charge control.

In a region close to the upper-limit state of charge, the battery can be charged with charging power that is kept at a relatively low level so as to curb or avoid overvoltage of the battery. In the second charge control mode in which the battery is charged in the region close to the upper-limit state of charge, the power supplied to the battery heater when the temperature of the battery is low, and charging and heating of the battery need to be conducted is controlled to be smaller than the power supplied to the battery heater in the first charge mode, such that the power diverted and added to the charging power upon stopping of the power supply to the battery heater can be restricted or reduced. Thus, the voltage of the battery is less likely or unlikely to exceed the upper-limit voltage due to increase of the charging power. Consequently, deterioration of the battery can be reduced.

In the electric power storage system as described above, the controller may be configured to inhibit the temperature regulation control from being performed even when the temperature of the battery is equal to or lower than the predetermined temperature, when the state of charge of the battery is larger than the predetermined value.

With the above arrangement, electric power is prevented from being diverted and added to charging power when supply of the power to the battery heater is stopped, and the charging power is not increased. Therefore, the battery voltage is less likely or unlikely to exceed the upper-limit voltage. Consequently, deterioration of the battery can be reduced.

A second aspect is concerned with an electric power storage system for a vehicle. The vehicle includes a motor for moving the vehicle, and a battery configured to supply electric power to the motor. The battery is adapted to be charged with external power supplied from an external power supply. The electric power storage system includes a temperature sensor, a battery heater, a charger, and a controller. The temperature sensor is configured to detect a temperature of the battery. The battery heater is configured to raise the temperature of the battery. The charger is connectable with the external power supply, and is configured to deliver the external power to the battery and the battery heater, respectively. The controller is configured to perform charge control and temperature regulation control when the temperature of the battery is equal to or lower than a predetermined temperature. The charge control is control for charging the battery with the external power. The temperature regulation control is control for supplying a part of the external power to the battery heater and raising the temperature of the battery when the temperature of the battery is equal to or lower than the predetermined temperature. The controller is configured to inhibit the temperature regulation control from being performed even when the temperature of the battery is equal to or lower than the predetermined temperature, when the state of charge of the battery is larger than a predetermined value.

According to the above aspect, even when the temperature of the battery is low, and the battery needs to be heated while being charged, temperature regulation control is not performed, i.e., no electric power is supplied to the battery heater, in a region where the state of charge of the battery is larger than the predetermined value. With this arrangement, electric power is prevented from being diverted and added to charging power when supply of power to the battery heater is stopped, and the charging power is not increased. Therefore, the voltage of the battery is less likely or unlikely to exceed the upper-limit voltage. Consequently, deterioration of the battery can be reduced.

A third aspect is concerned with an electric power storage system for a vehicle. The vehicle includes a battery adapted to be charged with external power supplied from an external power supply. The electric power storage system includes a temperature sensor, a battery heater, a charger, and a controller. The temperature sensor is configured to detect a temperature of the battery. The battery heater is configured to raise the temperature of the battery. The charger is connectable with the external power supply, and is configured to deliver the external power to the battery and the battery heater, respectively. The controller is configured to perform charge control for charging the battery with the external power, perform temperature regulation control using a first electric power when a state of charge of the battery is larger than a predetermined value and the temperature of the battery is equal to or lower than a predetermined temperature, and perform temperature regulation control using a second electric power when the state of charge of the battery is equal to or smaller than the predetermined value and the temperature of the battery is equal to or lower than the predetermined temperature. The second electric power is equal to or larger than the first electric power, and the temperature regulation control is control for supplying a part of the external power to the battery heater and raising the temperature of the battery.

In the electric power storage system according to the first, second or third aspects, the predetermined value may be lower than an upper-limit value of the state of charge of the battery, and the upper-limit value may be equal to a full charging capacity of the battery, or may be lower than the full charging capacity and an upper-limit value of a permissible range of the state of charge of the battery under the charge control.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiments are described below.

Figure 1:
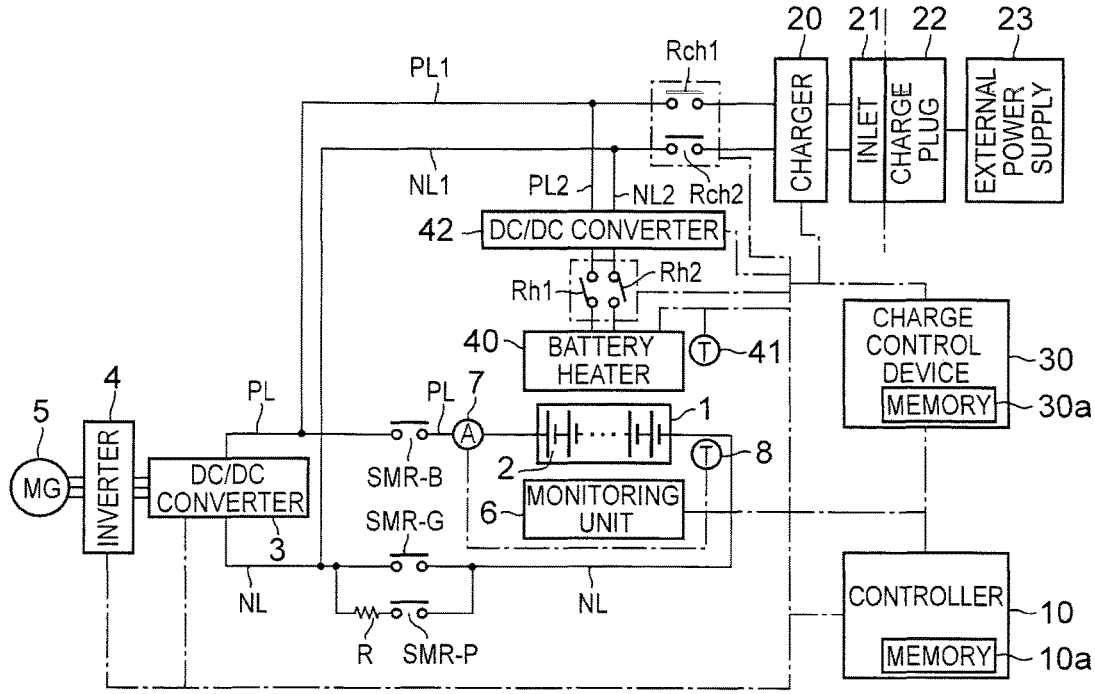
FIG. 1 is a view showing the configuration of a battery system installed on a vehicle according to embodiments.

FIG. 1 through FIG. 7 show embodiments. FIG. 1 is a block diagram showing the configuration of a battery system installed on a vehicle. The battery system may be installed on a vehicle, such as a plug-in hybrid vehicle having a function of charging a battery with power from an external power supply, or an electric vehicle.

The battery system of some embodiments includes a charge/discharge system and an external charge system. In the charge/discharge system, DC power is supplied from a battery 1 to a motor-generator (MG) 5 via an inverter 4, and the battery 1 is charged with regenerative energy during braking of the vehicle. In the external charge system, a temperature regulator is provided for the battery 1, and the battery 1 is charged with electric power from an external power supply 23.

As shown in FIG. 1, the battery 1 is a battery assembly having a plurality of unit cells 2 electrically connected in series. As each of the unit cells 2, a secondary cell, such as a nickel-metal-hydride cell or a lithium-ion cell, may be used. Also, an electric double layer capacitor may be used in place of the secondary cell.

The above-mentioned plurality of unit cells 2 (electric power storage devices) are electrically connected in series by a bus bar, to constitute the battery 1. A plurality of sets of two or more unit cells 2 electrically connected in parallel may be connected in series, to constitute the battery 1. The number of the unit cells 2 that constitute the battery 1 may be determined as desired, according to the required output, etc. of the vehicle on which the battery 1 is installed.

In the battery system of some embodiments, a DC/DC converter 3 (booster circuit) is connected between the battery 1 and the inverter 4, and the DC/DC converter 3 connected to the battery 1 is connected to the inverter 4. The DC/DC converter 3 can boost or raise the output voltage of the battery 1, and deliver it to the inverter 4. Also, the DC/DC converter 3 can lower the output voltage from the inverter 4 to the battery 1.

System main relays SMR-B, SBR-G are respectively provided in a positive line PL connected to a positive terminal of the battery 1, and a negative line NL connected to a negative terminal of the battery 1. The system main relays SMR-B, SMR-G are switched between ON and OFF, in response to control signals from a controller 10. A system main relay SMR-P and a current-limiting resistor R are connected in parallel with the system main relay SMR-G, and the system main relay SMR-P and the current-limiting resistor R are connected in series.

The system main relays SMR-B, SMR-G permit the battery 1 and the DC/DC converter 3 (inverter 4) to be electrically connected to each other. To connect the battery 1 to the DC/DC converter 3, the controller 10 initially switches the system main relays SMR-B, SMR-P from OFF to ON. As a result, electric current flows through the current-limiting resistor R, whereby inrush current, which would flow when the battery 1 is connected to the inverter 4, can be curbed or reduced.

After switching the system main relay SMR-G from OFF to ON, the controller 10 switches the system main relay SMR-P from ON to OFF. In this manner, connection between the battery 1 and the DC/DC converter 3 (inverter 4) is completed, and the battery system shown in FIG. 1 is brought into a startup (ready-on) state. The controller 10 receives information concerning ON/OFF (IG-ON/IG-OFF) of the ignition switch of the vehicle. The controller 10 starts the battery system, in response to switching of the ignition switch from OFF to ON.

When the ignition switch is switched from ON to OFF, on the other hand, the controller 10 switches the system main relays SMR-B, SMR-G from ON to OFF. As a result, the battery 1 and the DC/DC converter 3 (inverter 4) are disconnected from each other, and the battery system is brought into a stopped state.

A monitoring unit 6 detects a voltage between the terminals of the battery 1, or detects a voltage of each unit cell 2. The monitoring unit 6 outputs the result of detection to the controller 10. The monitoring unit 6 may detect a voltage value of each of the unit cells 2, or detect a voltage across a set of a given number of unit cells 2 connected in series, as one block. The number of the unit cells 2 included in one block may be set as desired.

A current sensor 7 detects electric current that flows through the battery 1, and outputs the result of detection to the controller 10. In some embodiments, the current sensor 7 is provided in the positive line PL connected to the positive terminal of the battery 1. The position at which the current sensor 7 is provided may be set as appropriate, provided that the current sensor 7 can detect the current flowing through the battery 1. For example, the current sensor 7 may be provided in the negative line NL connected to the negative terminal of the battery 1. Also, two or more current sensors 7 may be used.

A temperature sensor 8 detects the temperature (battery temperature) of the battery 1. The temperature sensor 8 outputs the result of detection to the controller 10. The temperature sensor 8 may be provided at one location in the battery 1, or may be provided at two or more different locations in the battery 1. When two or more detected temperatures of the battery 1 are used, the minimum value or maximum value of the two or more detected temperatures, or a middle value or average of the two or more detected temperatures, or the like, may be used as appropriate, as the temperature of the battery 1.

The controller 10 may include a memory 10*a*. The memory 10*a* stores respective detected values of the monitoring unit 6, current sensor 7, and the temperature sensor 8, calculated values of the SOC, full charging capacity, etc. calculated using the respective detected values, various kinds of information used for charge/discharge control, and so forth. The memory 10*a* may be configured as a separate storage region externally connected to the controller 10. Namely, the memory 10*a* may be incorporated in or externally connected to the controller 10. This holds true with a memory 30*a* of a charge control device 30 which will be described later.

The controller 10 calculates (estimates) the SOC of the battery 1, based on the voltage value detected by the monitoring unit 6, current value detected by the current sensor 7, and the battery temperature detected by the temperature sensor 8. Then, the controller 10 performs charge/discharge control of the battery 1, based on the calculated SOC and the estimated value of the full charging capacity. The controller 10 may be configured to include respective functional units, such as an SOC estimating unit, a full charging capacity computing unit, and so forth.

The SOC (state of charge) of the battery 1 represents the ratio of the current charge capacity to the full charging capacity of the battery 1, and the full charging capacity is the upper limit of the SOC. The SOC may be specified from the open circuit voltage (OCV) of the battery 1. For example, the correspondence relationship between the OCV and the SOC of the battery 1 is stored in advance as an OCV-SOC map in the memory 10*a*. The controller 10 calculates the OCV of the battery 1, from the closed circuit voltage (CCV) detected by the monitoring unit 6, and calculates the SOC from the OCV-SOC map.

Since the correspondence relationship between the OCV and the SOC of the battery 1 varies depending on the battery temperature, the OCV-SOC map may be stored in the memory 10*a* for each battery temperature, and the SOC of the battery 1 may be estimated by selecting one from OCV-SOC maps for respective battery temperatures, according to the battery temperature detected when the SOC is estimated from the OCV of the battery 1.

Accordingly, the controller 10 can grasp an excessively charged condition or excessively discharged condition of the battery 1, by monitoring the voltage value (CCV) detected by the monitoring unit 6 during charging or discharging. For example, the controller 10 may perform charge/discharge control, by restricting charging of the battery 1 such that the calculated SOC does not become higher than an upper-limit SOC predetermined relative to the full charging capacity, or restricting discharging such that the calculated SOC does not become lower than a lower-limit SOC.

The controller 10 may be provided for each of the DC/DC converter 3, inverter 4, and the motor-generator 5, or may be configured as one control unit constituted by two or more control devices.

Next, an external charge system of the battery system for charging the battery 1 with external power from the external power supply 23 will be described. The external charge system performs external charging of the battery 1 with external power supplied from the external power supply 23, and temperature regulation of the battery 1 using the temperature regulator.

A charger 20 is connected to the battery 1 via charge lines PL1, NL1. The charge line PL1 is connected to the positive line PL between the positive terminal of the battery 1 and the DC/DC converter 3. The charge line NL1 is connected to the negative line NL between the negative terminal of the battery 1 and the DC/DC converter 3.

Charge relays Rch1, Rch2 are provided in the charge lines PL1, NL1, respectively. The charge relays Rch1, Rch2 are switched between ON and OFF, in response to a control signal from the charge control device 30. When the charge relays Rch1, Rch2 and the system main relays SMR-B, SMR-G are switched to ON, the battery 1 and the charger 20 (the external power supply 23) are electrically connected to each other.

A charge plug 22 is connected to an inlet 21. The charge plug 22 is a connector provided in a charge cable that is extended from the external power supply 23. With the charge plug 22 connected to the inlet 21, external power can be supplied from the external power supply 23 to the battery 1 via the charger 20. In this manner, the battery 1 can be charged, using the external power supply 23. The charger 20 is provided with an AC/DC converter (not shown). When AC power is supplied from the external power supply 23, the charger 20 converts the AC power from the external power supply 23 to DC power, and supplies the DC power to the battery 1. Charging of the battery 1 with electric power supplied from the external power supply 23 will be called "external charging".

While external charging is performed by connecting the charge plug 22 to the inlet 21 in some embodiments, the external charge system is not limited to this arrangement. More specifically, a so-called non-contact charge system may be used for supplying the battery 1 with electric power of the external power supply 23. In the non-contact charge system, electromagnetic induction or resonance phenomena may be utilized, such that electric power can be supplied without passing current through a cable. The non-contact charge system may employ a known arrangement or configuration as appropriate.

The charger 20 is connected to a DC/DC converter 42 via power lines PL2, NL2. The DC/DC converter 42 is connected to a battery heater 40, and is operable to raise the voltage of DC power received from the charger 20, and delivers the resulting power to the battery heater 40. The battery heater 40 is a heating device for raising the temperature of the battery 1, and is also a temperature regulator driven with external power. A temperature sensor 41 detects the temperature (heater temperature) of the battery heater 40, and outputs the result of detection to the controller 10 or the charge control device 30.

For example, an electric heater that converts electric energy to thermal energy may be used as the battery heater 40. The battery heater 40 may be provided in direct contact with the battery 1, or may be indirectly provided with a member or space interposed between the heater 40 and the battery 1. Also, two or more electric heaters may constitute one battery heater 40. In this case, heating portions may be provided at two or more locations in the battery 1.

Switches Rh1, Rh2 are provided in the power lines PL2, NL2, respectively. The switches Rh1, Rh2 are switched between ON and OFF under control of the controller 10 or the charge control device 30. When the switches Rh1, Rh2 are placed in the ON positions, the DC/DC converter 42 and the battery heater 40 are connected to each other.

The charger 20 performs first power supply to supply the battery 1 with external power, and second power supply to supply the battery heater 40 with external power via the DC/DC converter 42. The charger 20 operates according to a control signal of the charge control device 30, and may perform the first power supply and the second power supply at the same time or independently of each other.

Figure 2:
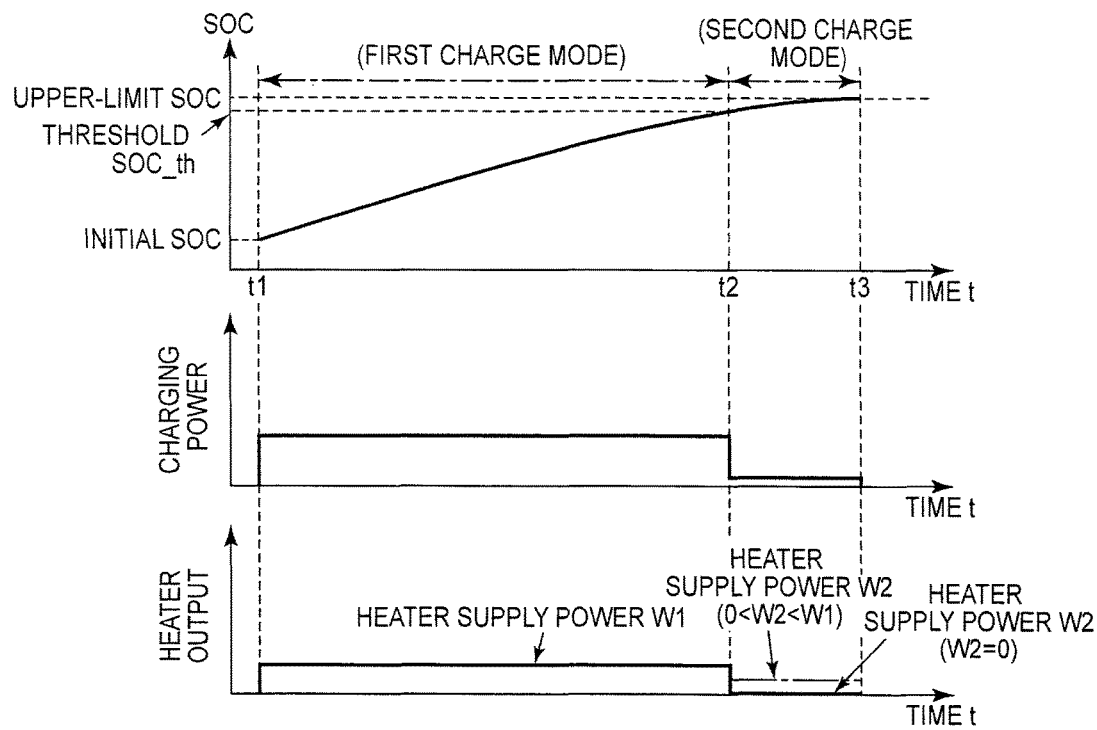
FIG. 2 is a view useful for explaining external charge control including temperature regulation control of a battery according to embodiments.

FIG. 2 is a view useful for explaining external charge control including temperature regulation control of the battery 1. In FIG. 2, the horizontal axis indicates time, and the vertical axes indicate the SOC of the battery 1, charging power supplied to the battery 1, and the heater output of the battery heater 40, respectively.

In some embodiments, external charging is performed in a selected one of two charge modes, i.e., a first charge mode and a second charge mode. In the first charge mode (corresponding to first charge control), constant-current (CC) charging is performed, namely, the battery 1 is charged with a preset permissible charging current, when the initial SOC of the battery 1 detected when external charging is started is equal to or smaller than a threshold value SOC_th of the first charge mode. In the second charge mode (corresponding to second charge control), constant-current constant-voltage (CCCV) charging is performed, namely, the battery 1 is charged with a charging current limited to a certain value that is smaller than the charging current of the first charge mode, such that the voltage of the battery 1 is controlled to be equal to or lower than a given value, in a region where the SOC of the battery 1 is larger than the threshold value SOC_th.

For example, as shown in FIG. 2, when the initial SOC of the battery 1 is equal to or smaller than the threshold value SOC_th, the charge control device 30 starts charging at time t1 with a constant charging current corresponding to a given charging power. The SOC (voltage) of the battery 1 increases with time, and reaches the threshold value SOC_th at time t2. At this time, the charge control device 30 switches to the constant-current constant-voltage charging (the second charge mode) in which the charging current is limited to a small value such that the voltage of the battery 1 is controlled to be equal to or lower than the given value. When the SOC reaches the upper-limit SOC at time t3, the charge control device 30 finishes charging.

In the constant-current constant-voltage charging, the upper-limit voltage is provided, and charging current is limited, in the region where the SOC of the battery 1 is larger than the threshold value SOC_th, as described above. If the battery 1 is charged in a condition where the SOC is high, the charging efficiency is reduced; therefore, the upper-limit voltage is provided and the charging current is limited to a small value, so as to curb or suppress a rise in temperature and overvoltage due to reduction of the charging efficiency. If the battery 1 is charged at a low temperature, the battery resistance (internal resistance) increases; therefore, the voltage increases in accordance with the product of the charging current and the internal resistance, as is understood from the relationship of V=IR (R: internal resistance). As the charging current increases, the voltage becomes excessively high, and deterioration of the battery progresses; therefore, constant-current constant-voltage charging is performed, namely, the charging current is limited to a small value such that the voltage does not exceed the upper-limit voltage during charging. In this manner, deterioration of the battery can be curbed or prevented.

In the example of FIG. 2, the upper-limit SOC set for external charging may be equal to the full charging capacity, or may be set to a value that is lower than the full charging capacity and is an upper limit of a permissible range of the SOC under the charge/discharge control of the battery 1. The threshold value SOC_th is a threshold value at which the charge control shifts from the first charge mode to the second charge mode. When the initial SOC detected when external charging is started is larger than the threshold value SOC_th, the charge control device 30 starts external charging in the second charge mode, without going through the first charge mode.

In some embodiments, when the temperature of the battery 1 is equal to or lower than a predetermined temperature, the temperature regulation control is performed on the battery 1 during charging, at the same time as or in parallel with the charge control as described above, as shown in FIG. 2. In the temperature regulation control, the battery heater 40 is operated, using a part of the external power supplied from the external power supply 23.

In the temperature regulation control, heater supply power is delivered from the charger 20 to the battery heater 40, such that the battery heater 40 is operated to provide a constant heater output so as to raise the temperature of the battery 1. For example, in the example of FIG. 1, the charger 20 supplies the battery 1 with a specific amount of charging power, out of the maximum power of the external power supplied from the external power supply 23, and delivers the remaining power, as the heater supply power, to the battery heater 40.

When the battery 1 is charged and heated at the same time, supply of electric power to the battery heater 40 may be urgently stopped sometimes, so as to protect the battery 1 when an abnormality occurs to the temperature of the battery 1 or the heater temperature of the battery heater 40.

Figure 3:
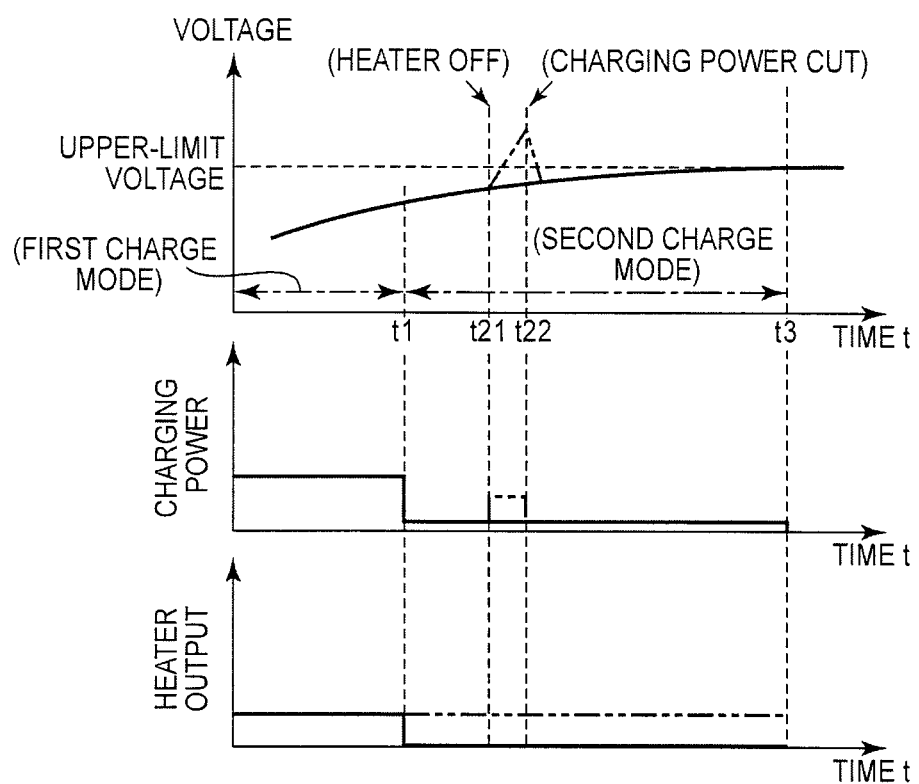
FIG. 3 is a view useful for explaining changes in charging power and the voltage of the battery when supply of electric power to a battery heater is stopped, when the charge control and the temperature regulation control are performed at the same time according to embodiments.

FIG. 3 is a view useful for explaining changes in the charging power and the voltage of the battery 1 when supply of power to the battery heater 40 is stopped. As shown in FIG. 3, the charge control device 30 can grasp or detect an abnormality in the temperature of the battery 1, etc., from the detection results of the temperature sensors 8, 41; therefore, the charge control device 30 initially places the switches Rh1, Rh2 of the power lines PL2, NL2 in the OFF positions upon occurrence of an abnormality, so as to stop supply of power to the battery heater 40 (HEATER OFF).

Since supply of power to the battery heater 40 is stopped while charging power is being supplied from the charger 20 to the battery 1, the power that has been supplied to the battery heater 40 is diverted for use as charging power, and the entire external power supplied from the external power supply 23 is supplied to the battery 1 as charging power, for example, resulting in increase of the charging power (the behavior indicated by a two-dot chain line in FIG. 3). Accordingly, when supply of power to the battery heater 40 is stopped while power is being supplied to the battery heater 40, the charge control device 30 needs to restrict or prevent a rapid increase in the charging power, by stopping charge control, or reducing the charging power thus increased (CHARGING POWER CUT). The above control is performed so as to prevent the voltage of the battery 1 (unit cell 2) from exceeding the upper-limit voltage.

However, if a time lag appears between the timing (time t21) of "HEATER OFF" and the timing (time t22) of "CHARGING POWER CUT", as shown in FIG. 3, the rapid increase in the charging power due to turn-off of the battery heater 40 cannot be suppressed, and the voltage of the battery 1 is rapidly increased. If the voltage of the battery 1 is rapidly increased in a condition where the SOC of the battery 1 is high, the voltage of the battery 1 (unit cell 2) may exceed the upper-limit voltage.

In particular, when the controller 10 that monitors conditions of the battery 1 grasps or detects an abnormality in the temperature of the battery 1 from the detection results of the temperature sensors 8, 41, and controls the switches Rh1, Rh2 of the power lines PL2, NL2 to the OFF positions upon occurrence of the abnormality, independently of the charge control device 30, a delay in communications from the controller 10 to the charge control device 30, a delay in control of the charge control device 30, and the like, may take place when the switches Rh1, Rh2 are placed in the OFF positions, relative to the time at which the controller 10 controls the switches Rh1, Rh2 to the OFF positions. As a result, the charging power may inevitably increase due to diversion of the power that has been supplied to the battery heater 40 for use as charging power.

Thus, in some embodiments, heater supply power W2 supplied to the battery heater 40 when the SOC of the battery 1 is larger than the threshold value SOC_th and the temperature of the battery 1 is equal to or lower than a predetermined temperature is set to be smaller than heater supply power W1 supplied to the battery heater 40 when the SOC is equal to or smaller than the threshold value SOC_th and the temperature of the battery 1 is equal to or lower than the predetermined temperature. In this manner, the electric power added to the charging power when supply of power to the battery heater 40 is stopped can be reduced, and the battery 1 is less likely or unlikely to deteriorate.

The heater supply power W2 is only required to be smaller than the heater supply power W1. For example, when the SOC of the battery 1 is larger than the threshold value SOC_th, the heater supply power W2 may be controlled such that 0<W2<W1, as indicated by a one-dot chain line in FIG. 2 showing the relationship between the heater output and time. More specifically, the heater supply power W2 may be controlled to be equal to or smaller than one tenth (1/10) of the heater supply power W1.

The situation where the heater supply power W2 is smaller than the heater supply power W1 includes a situation where the heater supply power W2 is smaller than a preset heater supply power W2' (W1>W2'>W2>0), in the case where temperature regulation control is performed by setting the heater supply power W2' in advance to a value smaller than the heater supply power W1. Namely, if the heater supply power W2 in the second charge mode is smaller than the heater supply power W1 in the first charge mode, or the heater supply power W2' (<W1) set in advance in the second charge mode, a region in which the voltage of the battery 1 exceeds the upper-limit voltage, which is indicated by a two-dot chain line in FIG. 3, can be reduced, and the battery 1 is less likely or unlikely to deteriorate.

Also, setting the heater supply power W2 to be smaller than the heater supply power W1 includes setting the heater supply power W2 to 0. Namely, the temperature regulation control may not be performed without supplying power to the battery heater 40. More specifically, when the SOC of the battery 1 is larger than the threshold value SOC_th, the power supplied to the battery heater 40 is made equal to 0, as indicated by a solid line in a graph of FIG. 2 indicating the relationship between the heater output and time. With this arrangement, electric power is prevented from being diverted for use as charging power when supply of power to the battery heater 40 is stopped, and the charging power is not increased. Therefore, the voltage of the battery 1 is less likely or unlikely to exceed the upper-limit voltage, and the battery 1 is less likely or unlikely to deteriorate.

Thus, when the temperature of the battery is equal to or lower than the predetermined temperature, the charge control and the temperature regulation control are performed at the same time in the first charge mode. In the region where the SOC of the battery 1 is equal to or smaller than the threshold value SOC_th, and the charge control is performed in the first charge mode, the SOC is lower than that in the second charge mode, and therefore, it is deemed possible to curb or prevent overvoltage even if the charging power is increased when supply of power to the battery heater 40 is stopped. Therefore, the temperature regulation control is performed with the heater supply power W1.

On the other hand, in the region where the SOC of the battery 1 is larger than the threshold value SOC_th, and the charge control is performed in the second charge mode, when the temperature of the battery 1 is equal to or lower than the predetermined temperature, the temperature regulation control may be performed with the heater supply power W2 that is smaller than the heater supply power W1, or the temperature regulation control may not be performed even if the temperature of the battery 1 is equal to or lower than the predetermined temperature. With this arrangement, it is possible to protect the battery 1 by reducing the region in which the voltage of the battery 1 exceeds the upper-limit voltage due to increase of the charging power in the region where the SOC of the battery 1 is large, or preventing the voltage from exceeding the upper-limit voltage, while assuring improvement of the charging efficiency of the battery 1 and reduction of the charge time by positively raising the temperature of the battery 1 in the region where the SOC of the battery 1 is small.

The threshold value of the SOC of the battery 1 used for performing the temperature regulation control with the heater supply power W2 smaller than the heater supply power W1 or inhibiting the temperature regulation control from being performed may be equal to the threshold value SOC_th used as a control boundary between the first charge mode and the second charge mode as described above, or may be a threshold value different from the threshold value SOC_th. For example, a given threshold value may be set within a range in which the voltage of the battery 1 is equal to or lower than a given value even if it exceeds the upper-limit value, when the charging power is increased due to power diverted and added to the charging power when supply of power to the battery heater 40 is stopped, or a given threshold value may be set within a range in which the voltage of the battery 1 does not exceed the upper-limit value. When the battery 1 is charged in a region where the SOC is larger than the thus determined threshold value, the temperature regulation control may be performed with the heater supply power W2 smaller than the heater supply power W1 when the temperature of the battery 1 is equal to or lower than the predetermined temperature, or the temperature regulation control may be inhibited from being performed even if the temperature of the battery is equal to or lower than the predetermined temperature, irrespective of the control boundary between the first charge mode and the second charge mode, and switching of the charge mode.

Figure 4:
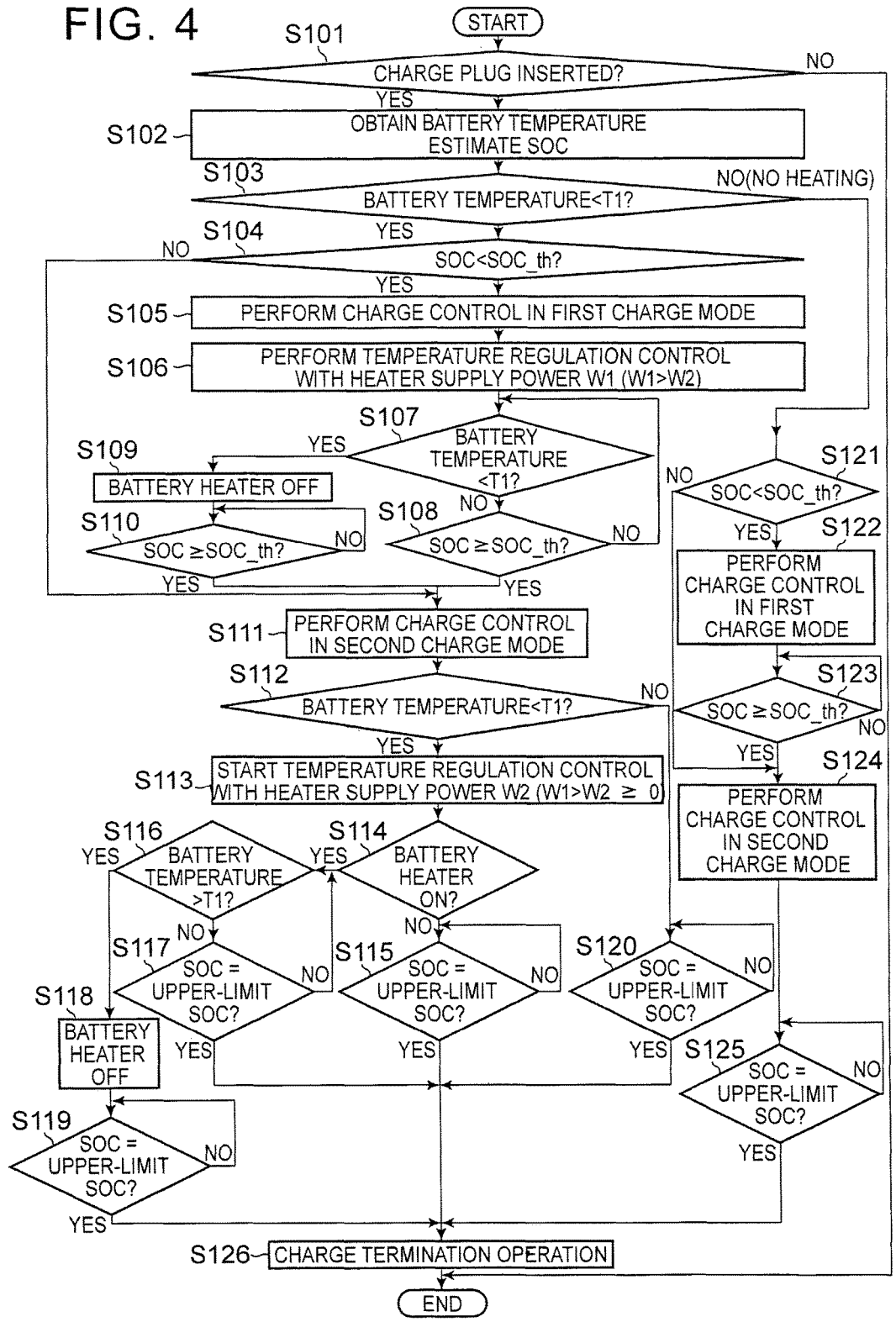
FIG. 4 is a view showing processing flow of the external charge control including the temperature regulation control according to embodiments.

FIG. 4 is a view illustrating processing flow of the external charge control including the temperature regulation control according to some embodiments. The processing of FIG. 4 is carried out by the charge control device 30.

If the charge plug 22 is connected to the inlet 21 (YES in step S101), a charge plug connection signal is generated from the inlet 21 to the charge control device 30, such that the charge control device 30 starts external charge control.

At the start of the external charge control, the charge control device 30 switches the charge relays Rch1, Rch2 from OFF to ON, and switches the system main relays SMR-B, SMR-G from OFF to ON so as to connect the charger 20 with the battery 1. The control for switching the system main relays SMR-B, SMR-G from OFF to ON may be performed by the charge control device 30 via the controller 10.

The charge control device 30 obtains the battery temperature T of the battery 1 measured when charging is started, from the temperature sensor 8. Also, the charge control device 30 obtains a detected voltage value of the battery 1 from the monitoring unit 6, and calculates the initial SOC at the start of charging (S102).

If the detected battery temperature T is higher than a temperature T1 (NO in step S103), the charge control device 30 performs normal external charging, without raising the temperature of the battery 1 using the battery heater 40 (S121). The temperature T1 is set in advance as a temperature at which the battery 1 need not be heated by the battery heater 40, and may be obtained by experiment, or the like, in view of the charging efficiency that varies with the battery temperature T.

If the battery temperature T is lower than the temperature T1 (YES in step S103), the charge control device 30 determines whether the initial SOC is smaller than the threshold value SOC_th (S104). If the initial SOC is smaller than the threshold value SOC_th, the charge control device 30 performs charge control in the first charge mode (S105), and places the switches Rh1, Rh2 in the ON positions so as to supply a part of external power to the battery heater 40 (S106). The power supplied to the battery heater 40 in this situation will be referred to as "supply power W1". The charge control device 30 is able to adjust the supply power supplied to the battery heater 40, by controlling the DC/DC converter 42. If it is determined in step S104 that the initial SOC is larger than the threshold value SOC_th, the charge control device 30 proceeds to step S111, and starts charge control in the second charge mode, without performing charge control in the first charge mode.

In steps S105, S106, the charging power in the first charge mode and the heater supply power required for the temperature regulation control may be set in advance. For example, the ratio of the charging power that leads to the shortest charge time and the heater supply power may be specified in advance, within the range of the maximum power of the external power supply 23. The charge control device 30 may set the charging power and the heater supply power, and performs the charge control and the temperature regulation control at the same time. The charge control may be started before the temperature regulation control is started, and the temperature of the battery 1 may be raised by the battery heater 40 while the battery 1 is being charged.

The charge control device 30 detects the battery temperature T of the battery 1 and the SOC (voltage) as needed, while the battery 1 is supplied with charging power and the battery heater 40 is supplied with the heater supply power W1 (S107). When the battery temperature T becomes higher than the temperature T1 (YES in step S107), the charge control device 30 stops supply of the power to the battery heater 40 so as to turn off the battery heater 40 (S109), and stops the temperature regulation control (heating of the battery 1 using the battery heater 40) while continuing only the charge control. Since the temperature of the battery 1 need not be raised any longer, the charge control device 30 sets the charging power again by adding the amount of power that has been supplied to the battery heater 40, to the charging power, so as to charge the battery 1 with the updated charging power in the first charge mode.

In the first charge mode, the battery 1 is charged with charging current corresponding to the charging power, until the SOC of the battery 1 reaches the threshold value SOC_th (S108). When the SOC of the battery 1 becomes larger than the threshold value SOC_th (YES in step S108), the charge control device 30 finishes charging in the first charge mode and switches to the second charge mode, even when the battery temperature T is lower than the temperature T1. Similarly, in step S110, when the SOC obtained after heating of the battery 1 is stopped becomes larger than the threshold value SOC_th (YES in step S110), the charge control device 30 finishes charging in the first charge mode, and switches to the second charge mode.

Then, in step S111, the charge control device 30 performs charge control in the second charge mode. In the charge control in the second charge mode, the charge control device 30 determines in step S112 whether the battery temperature T is lower than the temperature T1.

When the charge control device 30 determines that the battery temperature T is lower than the temperature T1, it sets electric power supplied to the battery heater 40 to supply power W2 (<W1, and ≥0) (S113). At this time, in one of the above-described methods, power supply control for supplying power to the battery heater 40 may be performed in the second charge mode. In the flowchart shown in FIG. 4, processing corresponding to the other method may be omitted.

First, when the temperature regulation control is performed with the heater supply power W2 that is smaller than the heater supply power W1, the charge control device 30 sets electric power supplied to the battery heater 40 to the supply power W2 (>0), and turns on the battery heater 40. At this time, when the battery temperature T is lower than the temperature T1, in a condition where the temperature regulation control is performed in the first charge mode, and the temperature regulation control needs to be performed in the second charge mode, the power supplied to the battery heater 40 is changed (reset) from the supply power W1 to W2, and the power is kept supplied to the battery heater 40. When charging is started in the second charge mode (NO in step S104), the battery heater 40 is in the OFF state, and therefore, the charge control device 30 sets the power supplied to the battery heater 40 to the supply power W2, and switches the battery heater 40 from OFF to ON.

When the temperature regulation control is performed in the second charge mode such that the heater supply power W2 (>0) is supplied to the battery heater 40 (YES in step S114), the charge control device 30 proceeds to step S116 to determine whether the battery temperature T is higher than the temperature T1. When the battery temperature T becomes higher than the temperature T1 while the battery heater 40 is supplied with the heater supply power W2 and the battery 1 is supplied with the charging power (YES in step S116), the charge control device 30 stops supply of the power to the battery heater 40, and turns off the battery heater 40 (step S118).

The charge control device 30 performs charge control until the SOC of the battery 1 reaches the upper-limit SOC (YES in step S117). When the SOC of the battery 1 becomes equal to the upper-limit SOC, the charge control device 30 performs a charge termination operation to finish the external charge control (step S126), even if the battery temperature T is lower than the temperature T1. Similarly, in step S119, when the SOC of the battery 1 becomes equal to the upper-limit SOC (YES in step S119), during the charge control in the second charge mode after the battery heater 40 is turned off, the charge control device 30 performs a charge termination operation to finish the external charge control (step S126).

Secondly, the battery system may be controlled such that the heater supply power W2 supplied to the battery heater 40 is set to 0, and the temperature regulation control is not performed in the second charge mode, even if the battery temperature T of the battery 1 is lower than the temperature T1. To inhibit the temperature regulation control from being performed, the switches Rh1, Rh2 may be switched from ON to OFF such that the battery heater 40 is turned off, or the DC/DC converter 42 may be controlled such that the heater supply power W2 becomes equal to 0 while the switches Rh1, Rh2 are kept ON.

In step S113, the charge control device 30 may set the heater supply power W2 to 0, and turns off the battery heater 40. When the temperature regulation control is performed in the first charge mode (when the battery heater 40 is in the ON state), the charge control device 30 switches the battery heater 40 from ON to OFF.

Thus, the charge control device 30 may start charging in the second charge mode, while turning off the battery heater 40 when the battery heater 40 is in the ON state), or inhibiting the battery heater 40 from being turned on when the battery heater 40 is in the OFF state.

When the battery heater 40 is controlled to the OFF state, such that the temperature regulation control is not performed in the second charge mode, the charge control device 30 may use a heating inhibition flag so as to inhibit the temperature regulation control from being performed. The charge control device 30 may set the heating inhibition flag to ON when the battery heater 40 is turned off, or may set the heating inhibition flag to ON when the initial SOC is larger than the threshold value SOC_th. The charge control device 30 may control execution/inhibition of the temperature regulation control when the battery temperature T of the battery 1 is lower than the temperature T1, by referring to ON/OFF of the heating inhibition flag stored in the memory 30a.

When the SOC of the battery 1 becomes equal to the upper-limit SOC, during charging in the second charge mode while the battery heater 40 is OFF (YES in step S115), the charge control device 30 performs a charge termination operation to finish the external charge control (S126).

When it is determined in step S112 that the battery temperature T is higher than the temperature T1, the charge control device 30 determines that the temperature regulation control need not be performed, and the battery heater 40 is switched to the OFF state if it is in the ON state. In this case, only the charge control is performed. When the SOC of the battery 1 becomes equal to the upper-limit SOC (YES in step S120), the charge control device 30 performs a charge termination operation so as to finish the external charge control (S126).

In step S121 and subsequent steps, normal external charging without heating is performed. When it is determined in step S103 that the battery temperature T is higher than the temperature T1, it is determined that the temperature regulation control of the battery 1 need not be performed in both the first charge mode and the second charge mode, in other words, throughout the external charge control. When the initial SOC is smaller than the threshold value SOC_th (YES in step S121), the charge control device 30 sets the charging power corresponding to the maximum power, for example, and performs charge control on the battery 1 (S122). When the SOC of the battery 1 becomes larger than the threshold value SOC_th (YES in step S123), the charge control device 30 finishes charging in the first charge mode, and switches from the first charge mode to the second mode.

Subsequently, the charge control device 30 switches to the second charge mode, and sets the charging power that is smaller than that in the first charge mode, to perform charge control on the battery 1 (step S124). When the SOC of the battery 1 becomes equal to the upper-limit SOC (YES in step S125), the charge control device 30 performs a charge termination operation so as to finish the external charge control (step S126). When it is determined in step S121 that the initial SOC is larger than the threshold value SOC_th, the battery system is controlled such that external charging is started in the second charge mode (step S124).

In the charge termination operation of step S126, the SOC (termination SOC) of the battery 1 at the time of completion of charging is calculated, and the full charging capacity is calculated, while the charge relays Rch1, Rch2 and the system main relays SMR-B, SMR-G are switched from ON to OFF such that the charger 20 and the battery 1 are disconnected from each other. The full charging capacity may be calculated using the initial SOC and the termination SOC, and the integrated value of charging current supplied to the battery 1 in the first charge mode and/or the second charge mode.

In the above description, the external charge control involving the temperature regulation control of some embodiments has been described, with respect to instant charging, as one example, which is started when triggered by connection of the charge plug 22 extended from the external power supply 23, to the inlet 21. However, embodiments are not limited to this type of charging.

Embodiments may employ timer charging in which charging is started at a preset charge start time. For example, when a timer charge switch (not shown) is pushed, the user is allowed to set a charge start time and/or a charge end time for timer charging. The charge control device 30 performs timer charging, by starting charging when the set charge start time comes, or starting charging when a charge start time calculated from the set charge end time and the current time comes. In the example of FIG. 4, it may be determined before step S101 whether the current time is the charge start time, and external charging may be started if the current time is the charge start time. The system may also be forced to finish external charging when the charge end time comes during external charge control.

Figure 5:
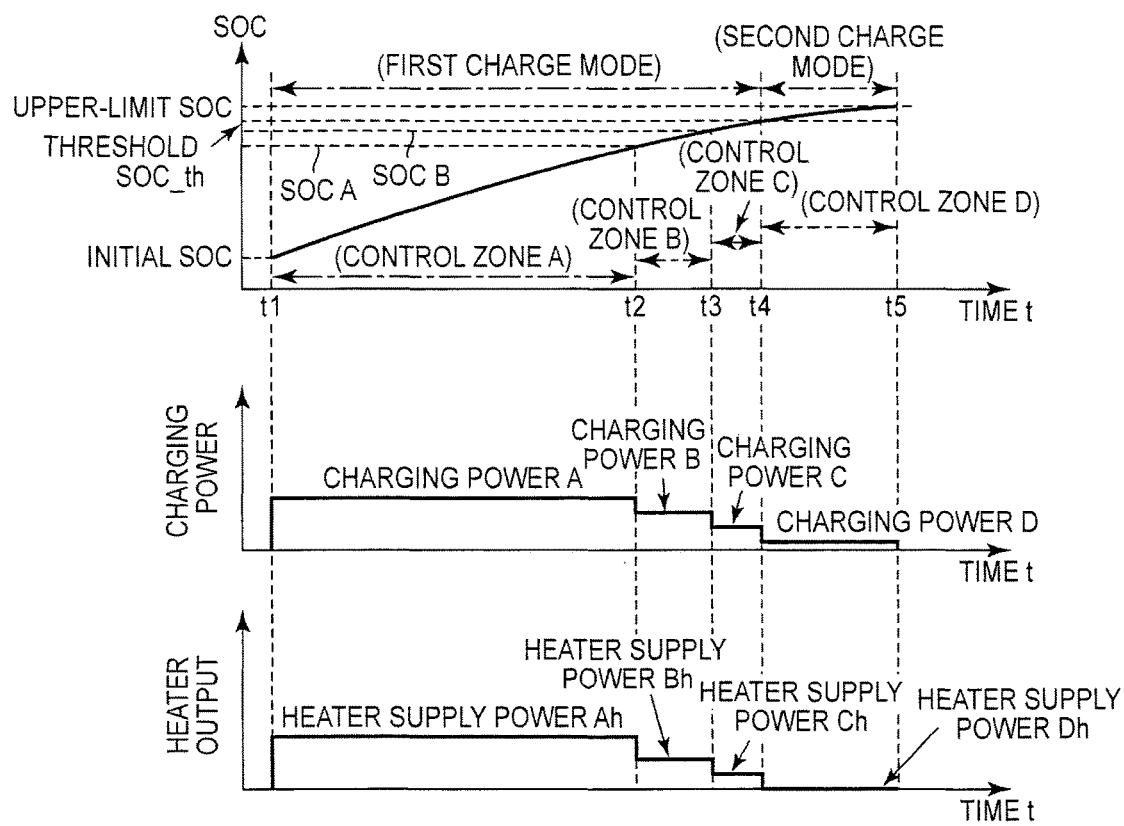
FIG. 5 is a view showing a modified example of first charge control, in the external charge control including the temperature regulation control of the battery according to embodiments.
Figure 6:
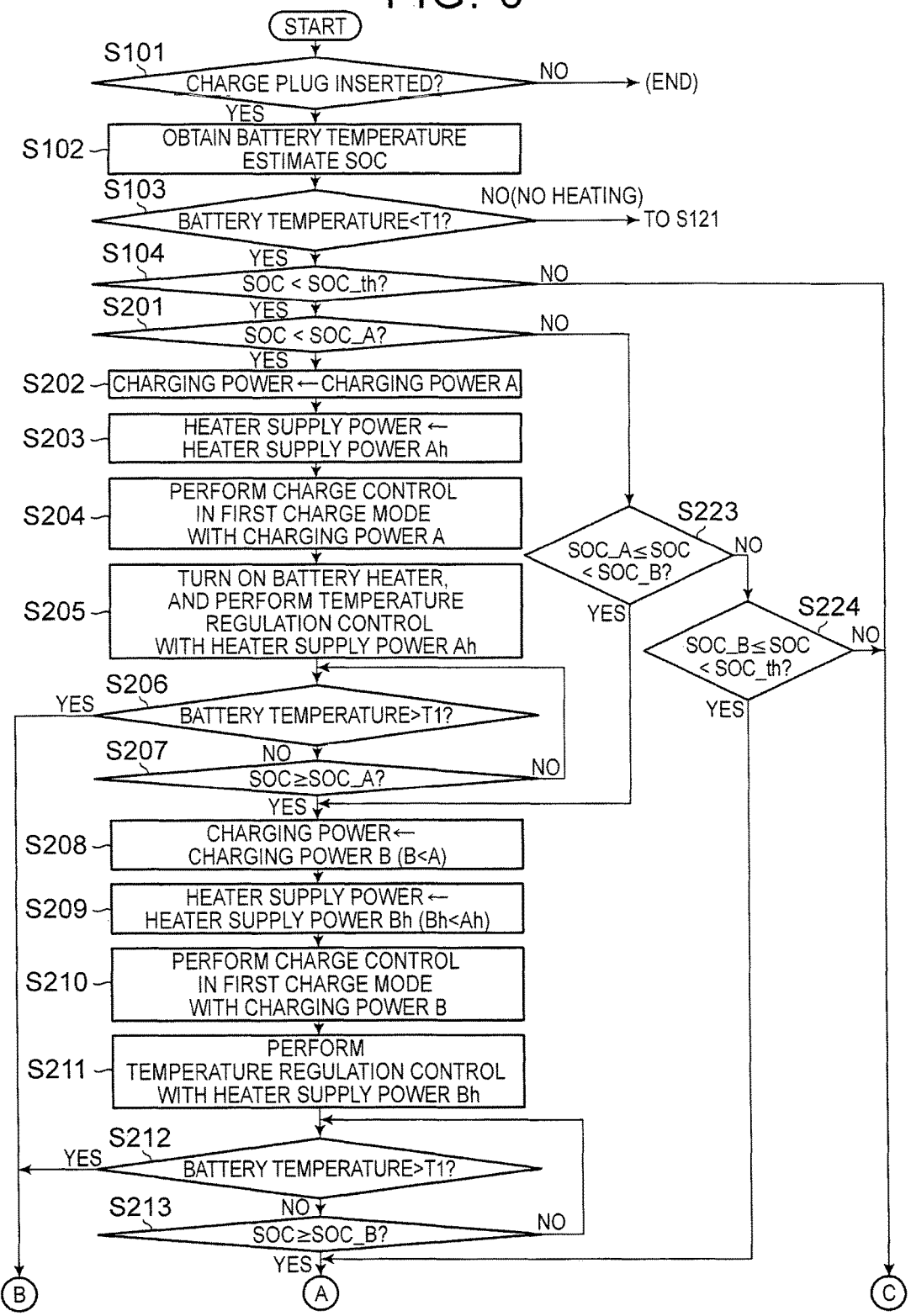
FIG. 6 is a view showing processing flow of external charge control of embodiments, more specifically, a modified example of a method of controlling charging power and temperature-elevating power (heater supply power) in the first charge control shown in FIG. 5.
Figure 7:
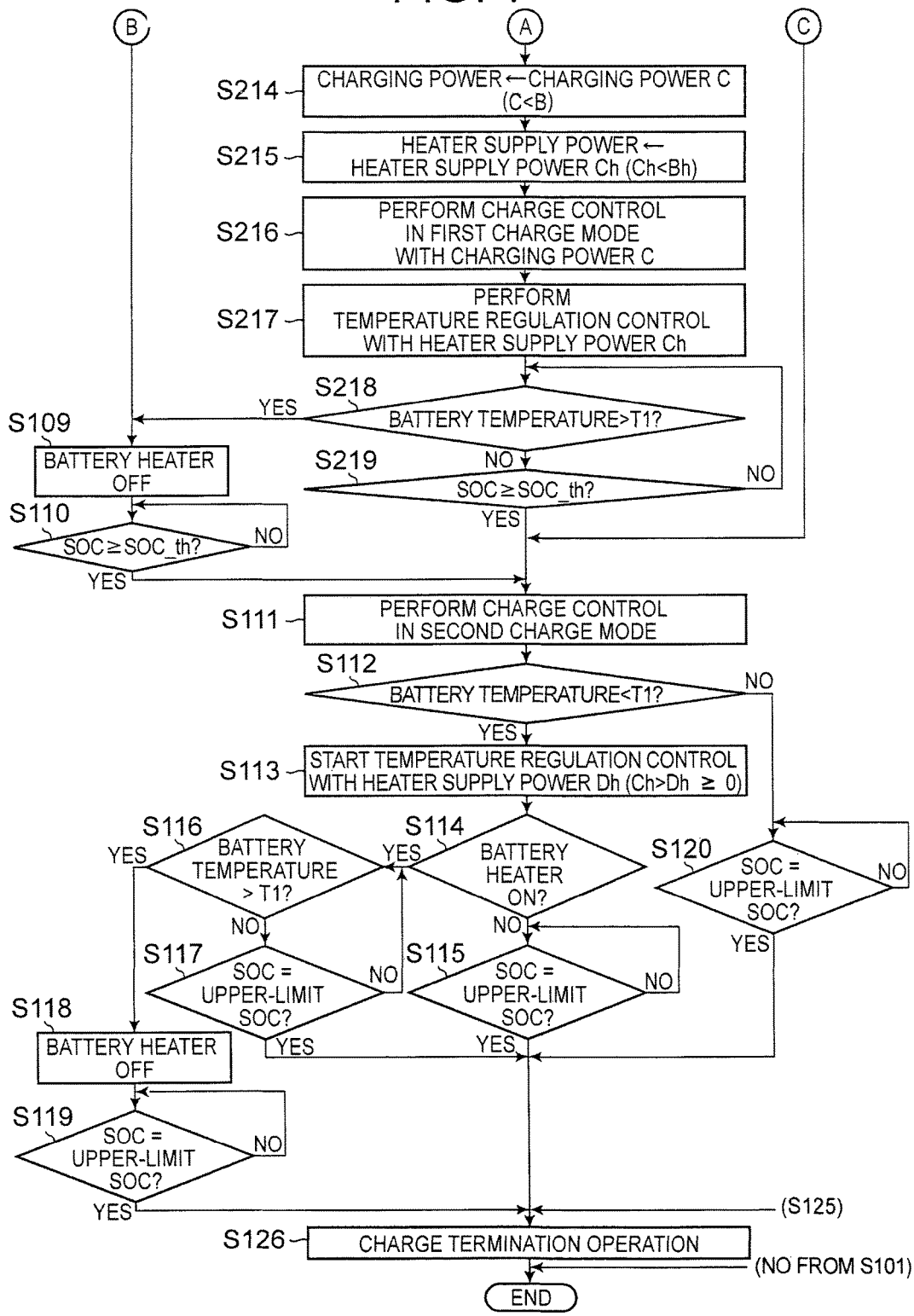
FIG. 7 is a view following FIG. 6 and showing the processing flow of the external charge control.

FIG. 5 through FIG. 7 are views showing a modified example of some embodiments. In the modified example, the temperature regulation control in the second charge mode as described above is assumed to be performed, and the charge control and temperature regulation control in the first charge mode are changed.

More specifically, in the first charge mode, when the temperature of the battery 1 is equal to or lower than a predetermined value, temperature regulation control is performed such that the power supplied to the battery heater 40 is reduced as the SOC of the battery 1 increases. Also, in the first charge mode, charge control is performed such that the charging power supplied to the battery 1 is reduced as the SOC of the battery 1 increases.

FIG. 5 is a view useful for explaining the external charge control including the temperature regulation control of the battery according to the modified example. While the charge control in the first charge mode is performed in a region where the SOC of the battery 1 is small, as compared with that in the second charge mode, as described above, the SOC of the battery 1 increases as the battery 1 is charged, and the voltage of the battery is increased toward the upper-limit voltage. Therefore, if supply of power to the battery heater 40 and charging are carried out at the same time, the voltage of the battery may exceed the upper-limit voltage when the power supply the battery heater 40 is stopped, even in the first charge mode.

Thus, as shown in FIG. 5, two or more control zones are provided in the first charge mode based on the magnitude of the SOC of the battery, and the temperature regulation control is performed such that the power supplied to the battery heater 40 is reduced as the SOC of the battery 1 in the current control zone is higher, while the charge control is performed such that the charging power supplied to the battery 1 is reduced as the SOC of the battery 1 in the current control zone is higher.

With the above arrangement, even when the power supply to the battery heater 40 is stopped while charging and heating of the battery 1 are performed at the same time, electric power diverted and added to charging power can be reduced, and the charging power supplied to the battery 1 can be kept at a relatively low level even if the power that has been supplied to the battery heater 40 is diverted for use as charging power. Accordingly, the voltage of the battery 1 is less likely or unlikely to exceed the upper-limit voltage (including reduction of the region in which the battery voltage exceeds the upper-limit voltage) due to an abnormality in the temperature of the battery 1, or the like, while the chance of raising the temperature of the battery in the first charge mode is assured.

FIG. 6 and FIG. 7 are views illustrating processing flow of the external charge control of the modified example. The same reference numerals or step numbers are assigned to the same steps as those of the processing flow of the external charge control shown in FIG. 4, and steps different from those of the processing flow of FIG. 4 will be mainly described in detail.

Initially, as shown in FIG. 5, in the region where the SOC of the battery 1 is equal to or smaller than the threshold value SOC_th, and charging is performed in the first charge mode, a control zone A (SOC≤SOC_A), a control zone B (SOC_A<SOC≤SOC_B), and a control zone C (SOC_B≤SOC≤threshold value SOC_th) are set in advance, according to the magnitude of the SOC of the battery 1. In this case, the charging power in each of the control zones is also set in advance, such that charging power A>charging power B>charging power C (>charging power D). When the charging power D is set in the second charging mode, and a control zone D is provided in which charging is performed in the second charging mode, the charging power C in the control zone C of the first charge mode adjacent to the control zone D may be set to be larger than the charging power D.

Further, the heater supply power in each of the control zones is set in advance, such that heater supply power Ah>heater supply power Bh>heater supply power Ch (>heater supply power Dh≥0). The heater supply power Dh is set in the second charging mode, and corresponds to the heater supply power W2 as described above. While the heater supply power Dh is equal to 0 in the example of FIG. 5, the heater supply power Dh may be set to be larger than 0 but smaller than the heater supply power Ch, as indicated by the one-dot chain line in FIG. 2. The heater supply power Ch of the control zone C of the first charge mode adjacent to the second charge mode is set to a value that is larger than the heater supply power Dh, and is also larger than 0. The information thus set is stored in the memory 30a.

As shown in FIG. 6, in steps S103, S104, the charge control device 30 performs charge control in the first charge mode, while performing the temperature regulation control at the same time, when the battery temperature T of the battery 1 is lower than the temperature T1, and the SOC is smaller than the threshold value SOC_th.

The charge control device 30 determines which of the control zones within which the SOC of the battery 1 falls. When the SOC of the battery 1 is smaller than the SOC_A corresponding to the control zone A (YES in step S201), the charge control device 30 sets the charging power A as the charging power (S202), and sets the heater supply power Ah as the heater supply power (S203).

The charge control device 30 performs charge control in the first charge mode, using the charging power A set in step S202 (S204), and performs temperature regulation control at the same time, by turning on the battery heater 40, and supplying the heater supply power Ah set in step S203 to the battery heater 40 (S205).

While the charging power A is supplied to the battery 1 and the heater supply power Ah is supplied to the battery heater 40, the charge control device 30 detects the battery temperature T and the SOC (voltage) of the battery 1 as needed. When the battery temperature T becomes higher than the temperature T1 (YES in step S206), the charge control device 30 stops supply of electric power to the battery heater 40, so as to turn off the battery heater 40 (S109), and continues to perform only the charge control while stopping the temperature regulation control (S110). In this connection, when the battery temperature T becomes higher than the temperature T1 during operation in the first charge mode, the charge control device 30 may perform charge control in the first charge mode, with a given charging power, irrespective of the two or more control zones of the first charge mode. Then, the charge control device 30 may switch to the second charge mode, when the SOC of the battery 1 becomes larger than the threshold value SOC_th (YES in step S110).

On the other hand, in the control zone A, the battery 1 is charged with charging current corresponding to the charging power A, until the SOC of the battery 1 becomes equal to SOC_A (S207), and the charge control device 30 switches to the control zone B when the SOC of the battery 1 becomes larger than SOC_A (YES in step S207).

When the charge control device 30 shifts the control zone of the battery 1 from A to B, and performs charge control and temperature regulation control in the control zone B, it sets the charging power again to the charging power B (<A) (S208), and sets the heater supply power again to the heater supply power Bh (<Ah) (S209). The charge control device 30 continues to perform charge control in the first charge mode (S210), with the charging power B set in step S208, and performs the temperature regulation control at the same time, by supplying the heater supply power Bh set in step S209 to the battery heater 40 (S211).

Similarly to step S206, when the battery temperature T becomes higher than the temperature T1 while the charging power B is supplied to the battery 1 and the heater supply power Bh is supplied to the battery heater 40 (YES in step S212), the charge control device 30 proceeds to steps S109, S110. In the control zone B, the battery 1 is charged with charging current corresponding to the charging power B, until the SOC of the battery 1 becomes equal to SOC_B (S213), and the charge control device 30 switches to the control zone C when the SOC of the battery 1 becomes larger than SOC_B (YES in step S213).

To subsequently perform charge control and temperature regulation control in the control zone C, the charge control device 30 sets the charging power again to the charging power C (<B) (S214), and sets the heater supply power again to the heater supply power Ch (<Bh) (S215). The charge control device 30 continues to perform charge control in the first charge mode with the charging power C set in step S214 (S216), and performs temperature regulation control at the same time, by supplying the heater supply power Ch set in step S215 to the battery heater 40 (step S217).

Similarly to steps S206, S212, when the battery temperature T becomes higher than the temperature T1 while the charging power C is supplied to the battery 1 and the heater supply power Ch is supplied to the battery heater 40 (YES in step S218), the charge control device 30 proceeds to steps S109, S110. Then, in the control zone C, the battery 1 is charged with charging current corresponding to the charging power C, until the SOC of the battery 1 becomes equal to the threshold value SOC_th (S219), and the charge control device 30 switches to the second charge mode when the SOC of the battery 1 becomes larger than the threshold value SOC_th (YES in step S219).

When the SOC of the battery 1 becomes larger than the threshold value SOC_th, the charge control device 30 proceeds to step S111, and performs charge control in the second charge mode, in the same manner as in FIG. 4. At this time, as in the example of FIG. 5, the second charge mode may be regarded as control zone D as one of the control zones that constitute the whole charge control. The charge control device 30 sets the charging power again to the charging power D (<C), and sets the heater supply power again to the heater supply power Dh (Ch>Dh≥0). When the temperature of the battery 1 is equal to or lower than the predetermined temperature, the temperature regulation control may be performed with the heater supply power Dh smaller than the heater supply power Ch, or charge control may be performed in the second charge mode (CCCV charging) while the temperature regulation control is inhibited, even if the battery temperature T of the battery 1 is equal to or lower than the predetermined temperature.

When it is determined in step S201 that the initial SOC of the battery 1 is equal to or larger than SOC_A (NO in step S201), the charge control device 30 proceeds to step S223, and determines whether the SOC of the battery 1 is within the control zone B. If the SOC of the battery 1 is equal to or larger than SOC_A but smaller than SOC_B, the charge control device 30 skips the control zone A (S202-S207), and proceeds to step S208, so as to perform charge control and temperature regulation control from the control zone B.

Similarly, when it is determined in step S223 that the initial SOC of the battery 1 is equal to or larger than SOC_B (NO in step S223), the charge control device 30 proceeds to step S224, and determines whether the SOC of the battery 1 is within the control zone C. When the SOC of the battery 1 is equal to or larger than SOC_B but smaller than the threshold value SOC_th, the charge control device 30 skips the control zone A (S202-S207) and the control zone B (S208-S213), and proceeds to step S214, so as to perform charge control and temperature regulation control from the control zone C.

Further, when it is determined in step S224 that the initial SOC of the battery 1 is equal to or larger than the threshold value SOC_th (NO in step S224), the charge control device 30 proceeds to step S111, and starts charge control in the second charge mode.

Thus, in the first charge mode of this modified example, the temperature regulation control is performed such that the power supplied to the battery heater 40 is reduced as the SOC of the battery 1 in the current control zone is higher, and the charge control is performed such that the charging power supplied to the battery 1 is reduced as the SOC of the battery 1 in the current control zone is higher. With this arrangement, even if the power supply to the battery heater 40 is stopped while charging and heating of the battery 1 are conducted at the same time, the power diverted and added to the charging power can be reduced, and the charging power supplied to the battery 1 can be kept at a low level even if the power that has been supplied to the battery heater 40 is diverted for use as the charging power. Accordingly, the voltage of the battery 1 is less likely or unlikely to exceed the upper-limit value, while the chance of raising the temperature of the battery in the first charge mode is assured.

In the modified example as described above, the temperature regulation control for reducing the power supplied to the battery heater 40, and the charge control for reducing the charging power supplied to the battery 1, as the SOC of the battery 1 in the current control zone is higher in the first charge mode, are combined. However, embodiments are not limited to this arrangement.

Namely, in the first charge mode, the charge control may be performed such that the charging power supplied to the battery 1 is kept constant without being changed, throughout the entire period of operation in the first charge mode, as shown in FIG. 3 and FIG. 4, while the temperature regulation control may be performed such that the power supplied to the battery heater 40 is reduced as the SOC of the battery 1 increases. In this case, too, the power supplied to the battery heater 40 is reduced in a region where the SOC of the battery 1 is higher; therefore, the amount of power diverted and added to charging power can be reduced, even if the power supply to the battery heater 40 is stopped while charging and heating of the battery are carried out at the same time. Therefore, the voltage of the battery 1 is less likely to unlikely to exceed the upper-limit voltage in the first charge mode, while the chance of raising the temperature of the battery 1 is assured.

Also, in the first charge mode, the temperature regulation control may be performed such that the power supplied to the battery heater 40 is kept constant without being changed, throughout the entire period of operation in the first charging mode, as shown in FIG. 3 and FIG. 4, while the charge control may be performed such that the charging power supplied to the battery 1 is reduced as the SOC of the battery 1 increases. In this case, too, the charging power supplied to the battery 1 is reduced in a region where the SOC of the battery 1 is higher; therefore, the charging power supplied to the battery 1 can be prevented from significantly increasing even if the power supply to the battery heater 40 is stopped while charging and heating of the battery 1 are carried out at the same time, and the power that has been supplied to the battery heater 40 is diverted and added to the charging power. Therefore, the voltage of the battery 1 is less likely to unlikely to exceed the upper-limit voltage, for example, while the chance of raising the temperature of the battery 1 is assured.

In this modified example, the power supplied to the battery heater 40 and the charging power supplied to the battery 1 are controlled to be reduced in a stepwise manner for each of the two or more control zones, as shown in FIG.

5. However, embodiments are not limited to this arrangement. For example, in the control zone B, the heater supply power may be controlled so as to be reduced from the heater supply power Ah of the control zone A toward the heater supply power Bh of the control zone B. Namely, the power supplied to the battery heater 40 and/or the power supplied to the battery 1 may be controlled to be reduced as the SOC of the battery 1 increases.

While two or more control zones are provided in the modified example, the control zones may not be provided. For example, the manner of increasing the SOC of the battery may be grasped, and the power supplied to the battery heater 40 and/or the charging power supplied to the battery 1 may be controlled to be reduced as the SOC of the battery 1 increases, such that the power supplied to the battery heater 40 and the charging power supplied to the battery 1 are reduced at a given rate, in accordance with the amount or rate of increase of the SOC.

The external charge control including the temperature regulation control according to some embodiments has been described above. While charging is conducted in two stages of the first charge mode and the second charge mode in some embodiments as described above, embodiments are not limited to this arrangement. For example, the battery system may be controlled in three or more different charge modes, or only in one charge mode, during the charging period (i.e., until the SOC reaches the upper-limit SOC). It is also possible to charge the battery with a constant charging current, without setting any mode. In this case, too, a threshold value of the SOC at which the charge mode is changed from one to another, or a threshold value set based on the relationship between the magnitude of the SOC of the battery 1 and the upper-limit voltage irrespective of the charge mode, may be used as a predetermined value. When the SOC of the battery 1 is larger than the predetermined value, the temperature regulation control may be performed at the same time as the charge control, by reducing the heater supply power supplied to the battery heater 40 when the SOC of the battery 1 is larger than the predetermined value and the temperature of the battery 1 is equal to or lower than a predetermined temperature, to be lower than the heater supply power supplied to the battery heater 40 when the SOC is smaller than the predetermined value and the temperature of the battery 1 is lower than the predetermined temperature, or the temperature regulation control may not be performed at the same time as the charge control, even when the battery temperature T of the battery 1 is equal to or lower than the predetermined temperatu

What is claimed is:

1. An electric power storage system for a vehicle, the vehicle including a motor for moving the vehicle, and a battery configured to supply electric power to the motor, the battery being adapted to be charged with external power supplied from an external power supply, the electric power storage system comprising:
    a temperature sensor configured to detect a temperature of the battery;
    a battery heater configured to raise the temperature of the battery;
    a charger that is connectable with the external power supply, and is configured to deliver the external power to the battery and the battery heater, respectively; and
    a controller configured to
    perform charge control and temperature regulation control when the temperature of the battery is equal to or lower than a predetermined temperature, the charge control being control for charging the battery with the external power, the temperature regulation control being control for supplying a part of the external power to the battery heater and raising the temperature of the battery when the temperature of the battery is equal to or lower than the predetermined temperature,
    the controller being configured to perform control for supplying a first electric power to the battery heater when a state of charge of the battery is larger than a predetermined value and the temperature of the battery is equal to or lower than the predetermined temperature, and
    the controller being configured to perform control for supplying a second electric power to the battery heater when the state of charge of the battery is equal to or smaller than the predetermined value and the temperature of the battery is equal to or lower than the predetermined temperature, the first electric power being smaller than the second electric power.

2. The electric power storage system according to claim 1, wherein
    the charge control includes first charge control and second charge control, the first charge control being performed by the controller when the state of charge of the battery is equal to or smaller than the predetermined value, the second charge control being performed by the controller when the state of charge of the battery is larger than the predetermined value, and
    the controller is configured to perform the temperature regulation control while performing the first charge control such that the power supplied to the battery heater is reduced as the state of charge of the battery increases.

3. The electric power storage system according to claim 2, wherein
    the controller is configured to perform the first charge control such that charging power supplied to the battery is reduced as the state of charge of the battery increases.

4. The electric power storage system according to claim 1, wherein
    the charge control includes first charge control and second charge control, the first charge control being performed by the controller when the state of charge of the battery is equal to or smaller than the predetermined value, and including a plurality of control zones, the control zones being defined based on a magnitude of the state of charge of the battery, the second charge control being performed by the controller when the state of charge of the battery is larger than the predetermined value, and
    the controller is configured to perform the charge control while performing the temperature regulation control, such that charging power supplied to the battery is reduced, and the power supplied to the battery heater is reduced, as the state of charge of the battery in one of the control zones in which the first charge control is currently performed is higher.

5. The electric power storage system according to claim 2, wherein
    the second charge control is a charge mode in which the battery is charged in a region in which the state of charge of the battery ranges from the predetermined value to a predetermined upper-limit value, the battery being charged in the charge mode with charging power that is smaller than charging power of the first charge control.

6. The electric power storage system according to claim 1, wherein the controller is configured to inhibit the temperature regulation control from being performed even when the temperature of the battery is equal to or lower than the predetermined temperature, when the state of charge of the battery is larger than the predetermined value.

7. The electric power storage system according to claim 1, wherein the predetermined value is lower than an upper-limit value of the state of charge of the battery, the upper-limit value being equal to a full charging capacity of the battery, or being lower than the full charging capacity and an upper-limit value of a permissible range of the state of charge of the battery under the charge control.

\* \* \* \* \*

UNITED STATES PATENT AND TRADEMARK OFFICE
CERTIFICATE OF CORRECTION

PATENT NO. : 10,358,047 B2
APPLICATION NO. : 15/313150
DATED : July 23, 2019
INVENTOR(S) : Takashi Murata and Tomokazu Masuda It is certified that error appears in the above-identified patent and that said Letters Patent is hereby corrected as shown below:

In the Specification

In Column 1, Line 07, after "PCT/", delete "M" and insert --IB-- therefor.

In Column 17, Line 47, delete "≤SOC" and insert --<SOC-- therefor.

In Column 21, Line 48, delete "temperatu" and insert --temperature.-- therefor.

Signed and Sealed this
Seventeenth Day of September, 2019

Andrei Iancu
*Director of the United States Patent and Trademark Office*